United States Patent
Levy

(10) Patent No.: US 7,844,507 B2
(45) Date of Patent: Nov. 30, 2010

(54) HANDLING HOUSEHOLD TASKS

(75) Inventor: Arik Seth Levy, San Francisco, CA (US)

(73) Assignee: Laundry Locker, Inc., San Francisco, CA (US)

( * ) Notice: Subject to any disclaimer, the term of this patent is extended or adjusted under 35 U.S.C. 154(b) by 702 days.

(21) Appl. No.: 11/386,528

(22) Filed: Mar. 22, 2006

(65) Prior Publication Data

US 2007/0250409 A1  Oct. 25, 2007

(51) Int. Cl.
*G06Q 10/00* (2006.01)
*G06Q 30/00* (2006.01)
*G06Q 50/00* (2006.01)

(52) U.S. Cl. .......................... 705/28; 705/15

(58) Field of Classification Search .................... 705/28
See application file for complete search history.

(56) References Cited

U.S. PATENT DOCUMENTS 4,348,967 A * 9/1982 Schattner et al. .............. 109/51
5,666,493 A * 9/1997 Wojcik et al. ................. 705/26

(Continued)

OTHER PUBLICATIONS

Sycamore System Publication (American Drycleaner 71,4,35(28), Jul. 2004.*

(Continued)

*Primary Examiner*—Matthew S Gart
*Assistant Examiner*—Harshad Parikh
(74) *Attorney, Agent, or Firm*—David Lewis

(57) ABSTRACT

In an embodiment, articles are left in storage areas, such as lockers or other receptacles, which may be associated with a household services company. In an embodiment, after depositing the articles in the storage area the articles are associated with the user by the household services company based on a claim by a user of using the storage are and/or tags associated with the articles.

31 Claims, 9 Drawing Sheets

U.S. PATENT DOCUMENTS

| | | | | | |
|---|---|---|---|---|---|
| 5,696,906 | A | * | 12/1997 | Peters et al. | 705/34 |
| 5,875,430 | A | * | 2/1999 | Koether | 705/15 |
| 5,959,275 | A | * | 9/1999 | Hughes et al. | 235/375 |
| 5,962,834 | A | * | 10/1999 | Markman | 235/385 |
| 6,085,168 | A | * | 7/2000 | Mori et al. | 705/17 |
| 6,199,755 | B1 | * | 3/2001 | Matsumoto et al. | 235/380 |
| 6,236,332 | B1 | * | 5/2001 | Conkright et al. | 340/3.1 |
| 6,285,986 | B1 | * | 9/2001 | Andrews | 705/26 |
| 6,321,202 | B1 | * | 11/2001 | Raveis, Jr. | 705/313 |
| 6,377,296 | B1 | * | 4/2002 | Zlatsin et al. | 348/143 |
| 6,428,382 | B1 | * | 8/2002 | Randolph | 446/149 |
| 6,470,303 | B2 | * | 10/2002 | Kidd et al. | 703/8 |
| 6,859,722 | B2 | * | 2/2005 | Jones | 701/200 |
| 6,974,077 | B1 | * | 12/2005 | Beyder et al. | 235/381 |
| 7,013,289 | B2 | * | 3/2006 | Horn et al. | 705/26 |
| 7,315,616 | B2 | * | 1/2008 | Annadata et al. | 379/266.01 |
| 7,366,586 | B2 | * | 4/2008 | Kaplan et al. | 700/241 |
| 2002/0046133 | A1 | * | 4/2002 | Sheth | 705/26 |
| 2002/0118095 | A1 | * | 8/2002 | Estes | 340/5.6 |
| 2004/0174392 | A1 | * | 9/2004 | Bjoernsen et al. | 345/751 |
| 2004/0243426 | A1 | * | 12/2004 | Hashimoto | 705/1 |
| 2004/0254802 | A1 | * | 12/2004 | Miller et al. | 705/1 |
| 2005/0190037 | A1 | * | 9/2005 | Shitan et al. | 340/5.5 |
| 2006/0271437 | A1 | * | 11/2006 | Maggio | 705/14 |
| 2008/0106368 | A1 | * | 5/2008 | Vitier | 340/5.5 |

OTHER PUBLICATIONS

Garde-Robe web site pages as of Apr. 18, 2005.*

Title: "Jacksonville Linen Attendant I job on JacksonvilleHelpWanted.com", Print Date: Aug. 27, 2008, Posting Date: Aug. 26, 2008, Site Name: regionalhelpwanted.com, URL:http://regionalhelpwanted.com/Search/detail.cfm?SN=37&ID=16872088&jexp=2, pp. 1.

Title: "Jobscience—Linen Attendant I", Print Date: Aug. 27, 2008, Posting Date: Aug. 13, 2008, Site Name: jobscience.com, URL: http://jobs.jobscience.com/JsrApp/index.cfm?cmd=showPositionDetail&positionID=471116&cobrandld=9000&masterld=SEGHS001&accountld=3964CB25-B8CD-AB83-60479DAD2C68E108&prodApp=CC153C84-AF0B-4F17-A32A-75AEC3B65159, pp. 3.

Title: "Job Detail", Print Date: Aug. 27, 2008, Posting Date: Aug. 18, 2008, Site Name: My Worksource, URL: https://fortress.wa.gov/esd/worksource/ShowJobDetail.aspx?JobID=1411983&SearchID=325388200&Sort=&Direction=&PageSize=25&PageIndex=3&RecordCount=1242&Sender=Employment. pp. 1.

Title: "Laundry and Dry-Cleaning Workers—51-6011.00", Print Date: Aug. 27, 2008, Site Name: Indiana Department of Workforce Development, URL:http://dwdonenet.in.gov/seekers.htm?onetCode=51-6011.00, pp. 1.

Title: 2008 | This year's top 10 life hack business ideas, Print Date: Feb. 17, 2009, Publication Date: Dec. 30, 2008, Site Name: Springwise.com, URL:http://springwise.com/life_hacks/2008_this_years_top_10_life_ha/, pp. 2.

Title: "Laundry service by the locker—Springwise", Print Date: Feb. 17, 2009, Publication Date: Sep. 8, 2008, Site Name: Springwise.com, URL: http://www.springwise.com/life_hacks/laundry_service_by_the_locked/, pp. 2.

Title: "SFAA | Laundry Locker: A Fresh Look at Laundry Delivery | by Emily Landes", Publication Date: May 2006, Print Date: Feb. 17, 2009, Site Name: San Francisco Apartment Association, URL: http://www.sfaa.org/0605landes.html, pp. 4.

Title: "Laundry Locker on KRON 4 with Gabe Slate", Posting Date: Sep. 26, 2007, Site Name: Youtube.com, URL: http://www.youtube.com/watch?v=2-qChq7VSSs (A CD containing the video is attached).

* cited by examiner

HANDLING HOUSEHOLD TASKS

FIELD

The current specification relates to performing household services.

BACKGROUND

The subject matter discussed in the background section should not be assumed to be prior art merely as a result of its mention in the background section. Similarly, a problem mentioned in the background section should not be assumed to have been previously recognized in the prior art. The subject matter in the background section merely represents different approaches to accomplishing various tasks.

Typically, use of a service through a web interface requires prior registration or account setup with the service provider.

BRIEF DESCRIPTION OF THE FIGURES

In the following drawings like reference numbers and labels are used to refer to the same elements. Although the following figures depict various examples of inventions associated with this specification, the inventions associated with this specification are not limited to the examples depicted in the figures.

DETAILED DESCRIPTION

Although the issues discussed in the background or elsewhere may have motivated some of the subject matter disclosed below, nonetheless, the embodiments disclosed below do not necessarily solve all of the problems associated with the subject matter discussed in the background or elsewhere. Some embodiments only address one of the problems, and some embodiments do not solve any of the problems associated with the subject matter discussed in the background or elsewhere.

In general, at the beginning of the discussion of each of FIGS. 1-5 is a brief description of each element. After the brief description of each element, each element is further discussed, usually in numerical order, but there is no one location where all of the information of any element of FIGS. 1-8 is necessarily located. Unique information about any particular element or any other aspect of any of FIGS. 1-8 may be found in, or implied by, any part of the specification.

In various places in discussing the drawings a range of letters, such as a-m or a-n are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "m") comes earlier in the alphabet than another letter (e.g., "n"), the order of these letters in the alphabet does not mean that the earlier letter represents a smaller number. The value of the earlier letter is unrelated to the later letter, and may represent a value that is greater than, the same as, or less than the later letter. The ellipses in the figures, which may be located between any two items, indicate that any number of similar items may be included between those two items.

Figure 1:
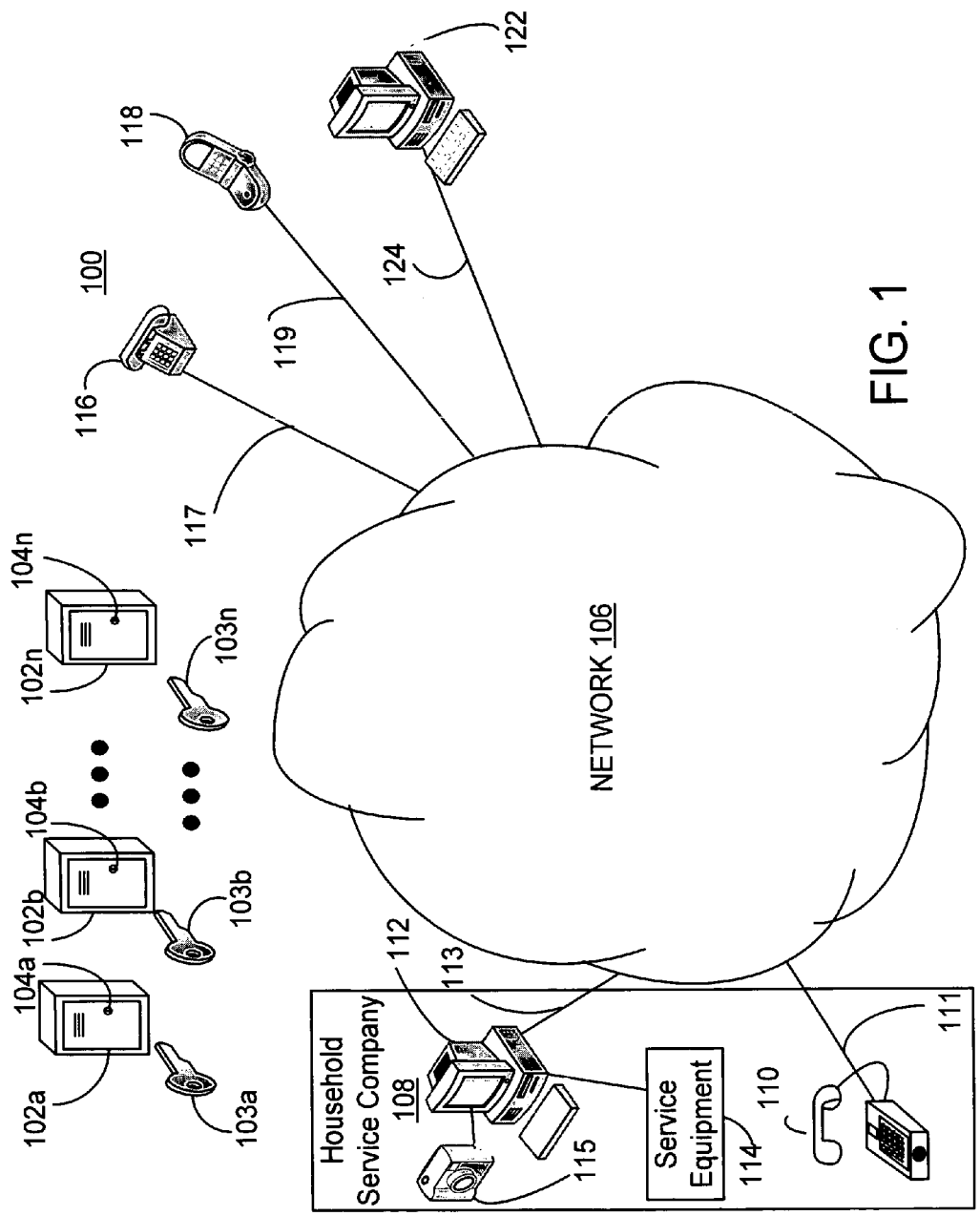
FIG. 1 shows a block diagram of an example of a system used for managing a set of storage areas for articles that need service.

FIG. 1 shows a block diagram of an example of service system 100. Service system 100 may include storage areas 102a-n, keys 103a-n, locks 104a-n, network 106, household services company 108, which may include answering system 110, link 111, computer system 112, link 113, service equipment 114, and camera 115. Service system 100 may also include phone 116, link 117, cell phone 118, link 119, network appliance 122, and link 124. In other embodiments, service system 100 may not include all of the components listed and/or may include other components in addition to or instead of those listed above.

FIG. 1 illustrates examples of a variety of ways in which a user may interact with a household services company associated with service system 100. In service system 100 users may deposit their articles for which service is desired in a storage area, optionally specify the manner in which their articles should be handled, and then pick up the articles from the same storage area. In an embodiment, the articles for which service is desired may be any of a number of different types of articles needing any of a number of different services, which will be discussed in conjunction with the description of household services company 108, below.

In service system 100 it is possible to first deposit the articles in a storage area, and then later establish an account and/or inform a representative of the household services company that the articles are in a storage area associated with the household services company waiting to be washed. In this specification the term household services company representative is generic to a household services company employee, because by virtue of being employed by the household services company the employee may at any time find himself or herself unexpectedly in a situation where the employee is required to do something on behalf of the household services company even if the household services company would not ordinarily want that employee to represent the household services company. The term household services company employee may be substituted for household services company representative in any place in this specification to obtain a specific embodiment.

Storage areas 102a-n may be capable of holding articles and may be accessible by both the user and one or more household services companies. In an embodiment, each of storage areas 102a-n stores articles associated with only one order. In another embodiment, each of storage areas 102a-n stores articles associated with only one account. In an embodiment, storage areas 102a-n may be lockers. In another embodiment, storage areas 102a-n may be any receptacle, such as bins, cages, baskets, containers, and/or bags (in this specification, the word receptacle is generic to a locker and any other container). In an embodiment, storage areas 102a-n are secure in the sense that only the user and household services company 108 are authorized to access storage areas 102a-n. After one of storage areas 102a-n is already in use, others desiring access to the same storage area, since they are not authorized to have access, are expected to be required to defeat at least one security device, such as by breaking the storage area, picking a lock, and/or breaking a code. In an embodiment, storage areas 102a-n may be associated with (e.g., owned, rented, and/or managed by) a household services company. In an alternative embodiment, one or more of storage areas 102a-n may be owned by another party unrelated to the household services company (e.g., owned by the user). In an embodiment, storage areas 102a-n are within a service area (e.g., a pickup radius) of the household services company.

Keys 103a-n are used for locking and unlocking storage areas 102a-n. Keys 103a-n may be any sort of key. In one embodiment, keys 103a-n may have teeth for moving a series of pins up and down until those pins are in line with a shear line of a lock cylinder, allowing that cylinder to rotate freely inside the lock and the lock to open. In another embodiment, keys 103a-n may be cards that are readable by a machine, such as cards having magnetic strips that store a code for opening an electronic lock. In an embodiment, keys 103a-n are stored in their respective locks. Removing one of keys 103a-n from the lock causes the lock to lock. When a user desires to use one of storage areas 102a-n, the user places the user's articles in the storage area desired, removes the key, which locks the storage area.

In an alternative embodiment, when storage areas 102a-n are not in use, keys 103a-n are stored inside storage areas 102a-n, and storage areas 102a-n are left unlocked. In an embodiment, a second set of copies of keys 103a-n are held by the household services company. In another embodiment, the household services company has another manner of accessing the contents of storage areas 102a-n (e.g., which may require a different set of keys), and consequently, the household services company does not necessarily have copies of keys 103a-n. When a user desires to use one of storage areas 102a-n, the corresponding one of keys 103a-n is removed from the storage area. Articles may then be placed into the storage area and the storage area may be locked. In an alternative embodiment, instead of keys 103a-n, one or more of storage areas 102a-n have combination locks or locks requiring an entry code that may be changed by the household services company and/or user.

Locks 104a-n may lock storage areas 102a-n. Locks 104a-n may be any sort of lock that accepts a physical key. In one embodiment, locks 104a-n are turn key locks. In an embodiment locks 104a-n store keys 103a-n when storage areas 102a-n, respectively, are not in use. While the key is in the lock, the lock is unlocked, and the user may place his or her belongings inside. Rotating one of keys 103a-n into a position in which the key may be freely removed and/or the act of removing the key, causes the corresponding one of locks 104a-n to lock. In another embodiment, locks 104a-n are electronic locks that are opened and closed in response to reading a card. The card may be stored in the lock, which may keep the lock unlocked, and removal of the card from the lock may cause the lock to lock. Locks 104a-n (as well as keys 103a-n) may be provided by the household services company.

In an alternative embodiment, the user may choose a combination and/or access code, lock the lock, and then if the household services company does not already have the combination or access code or an alternative combination or access code that opens the same lock, the user may inform the household services company what the access code or combination is. In another embodiment, instead of locks 104a-n being supplied by the household services company, as long as both the user and the household services company are able to open locks 104a-n, one or more of locks 104a-n may be supplied by the users.

Network 106 may be any one or any combination of one or more Local Area Networks (LANs), Wide Area Networks (WANs), wireless networks, telephone networks, and/or other networks. Network 106 may be used by users and the household services company to communicate with one another regarding articles in storage area 102a-n and/or articles being serviced by the household services company.

Household services company 108 may pick up the articles from storage areas 102a-n, service the articles, and drop off the service articles in storage areas 102a-n. Alternatively, household services company 108 may oversee or manage the picking up, servicing, and dropping off of the articles. For example, household services company 108 may outsource the servicing of the articles, the picking up of the articles and/or the dropping of the articles.

Household services company 108 may wash laundry, dry clean clothing, shine shoes, polish silverware, duplicating keys, clean handbags, sharpen kitchen knives or other tools, deliver packages, or perform other services for other articles. In an embodiment, household services company 108 tags the articles upon picking up the articles to identify the user and/or storage area associated with the articles. In an embodiment, items that are dry cleaned and/or require individual handling are individually tagged, while items that are washed are tagged by the batch. In an embodiment, household services company 108, if given permission by the user, attaches a permanent tag to items that the user wishes to have dry cleaned or wishes to receive individual attention. Household services company 108 may store a history of the article and handling preferences in association with an identifier on a permanent tag.

In alternative embodiments, household services company 108 may periodically check storage areas 102a-n to see if any batches of articles have been delivered. In an alternative embodiment, the user tags a batch of articles (e.g., a bag of laundry) that is placed within one of storage areas 102a-n. For example, the user may be set up with a bag for articles and a label prior to using household services company 108 or the user may fill out a slip identifying the batch of articles while the user is at one of storage area 102a-n. Household services company 108 may include one or more electronic storage areas (e.g., electronic lockers), which may accept payments at the storage area.

Household services company 108 may also operate as a conventional household services company (e.g., a conventional repair shop, laundry mat and/or dry cleaners). When a user wants a batch of articles serviced, the user may choose to have part of the process occur using one of the methods described herein and another part of the process occur using another method. For example, the user may drop off the articles in one of storage areas 102a-n and then pick up the articles in person at household services company 108 from a representative of household services company 108 and return the key to the representative of the household services company, instead of returning the key to the storage area from where the articles were dropped off. As another example, the user may drop off the articles at household services company 108 and pickup one of key 103a-n. Then when the articles have been serviced, the user may pickup the articles from one of storage areas 102a-n, and leave the key in the corresponding lock. In an embodiment, the user may reserve one of storage areas 102a-n (e.g., by taking the key) and optionally inform household services company that the user is expecting a delivery. Household services company 108 may receive packages on behalf of the user (that were delivered by the post office or a delivery service such as UPS). Alternatively, if no locker was reserved, (1) household services company 108 may then place the package in one of storage areas 102a-n, and then inform the user that the package is ready for pickup, (2) prior to placing the delivered package in one of storage areas 102a-n wait for the user to inform household service company 108 that a storage area has been reserved by the user, or (3) may ask that the user choose a storage area where to deliver the package (e.g., by taking the key until the package is delivered). In another embodiment, after a package is received, household services company 108 places the package in one of storage areas 102a-n, takes the key associated with that storage area, places the key in a lock box, which may be associated with the storage area, and e-mails or otherwise notifies the user of the combination.

Answering system 110 is optional. Answering system 110 may include one or more answering machines and/or telephones. After dropping off articles, a user may phone household services company 108, and answering system 110 may receive and handle the call automatically or may handle the call with the assistance of a human operator. Link 111 links answering system 110 to one or more networks via which messages are sent from the users to household services company 108. In one embodiment, answering system 110 is one or more ordinary telephones and/or answering machines. Embodiments in which answering system 110 includes devices other than ordinary telephones and/or answering machines are discussed in conjunction with computer system 112 and FIGS. 3 and 4, below.

Computer system 112 may receive text and/or voice messages from users after articles have been dropped off, and computer system 112 may be linked to network 106 via link 113. Computer system 112 may be used to host and/or maintain a website associated with household services company 108. For example, computer system 112 may include one or more web servers and/or one or more administrative servers. Users may logon to a website associated with household services company 108, inform household services company 108 about the location of articles that are ready to be picked up, set up an account, make payments (e.g., on line), indicate specifics about how to handle the articles (e.g., whether to wash or dry clean the clothing, how much if any starch to use, whether to set a wash to delicate, heavy, cold, or hot, and/or what type of detergent or solvent to use), and/or check the current status of a batch of articles. Alternatively, computer system 112 may communicate with user via e-mail, instant messaging, Short Message Service (SMS) messaging, and/or other forms of text and/or voice communications.

Answering system 110 and computer system 112 may be communicatively linked. Answering system 110 and/or computer system 112 may be similar in that both may receive and process orders for providing service and/or may setup new accounts. Answering system 110 and/or computer system 112 may store customer information and/or information related to the current status of each user's articles being handled by household services company 108. Answering system 110 and/or computer system 112 may include, and/or may be linked to, a database for tracking articles and storing user information. In an embodiment, household services company 108 includes both answering system 110 and computer system 112. In another embodiment, household services company 108 includes only one of answering system 110 and computer system 112. In an embodiment, answering system 110 may accept payments either via a human operator or via a series of one or more automated voice activated payment menus.

Service equipment 114 may include any equipment that is used for servicing articles. For example, service equipment 114 may include equipment for cleaning clothing, such as washing machines, dryers, combined washer-dryers, and/or dry cleaning equipment. There are many different types of dry cleaning equipment that may be used within service equipment 114. Dry cleaning equipment may include any machine that cleans clothing using a solvent that does not include water. For example, hydrogen, Stoddard solvent, carbon tetrachloride, trichlolroethane, Valcene 113 and Freon 113 may be used as dry cleaning solvents. In an embodiment, the dry cleaning machine may be somewhat similar to a combination of a washing machine and a dryer or there may be a separate washer and dryer. In one embodiment, garments may be placed into a washing/extraction chamber (which is sometimes referred to as a basket, or drum), which may be the core of the dry cleaning machine. The washing chamber may contain a horizontal, perforated drum (which is the basket) that rotates within an outer shell. The shell may hold the one or more dry cleaning solvents while the rotating drum may hold a garment bag. However, there are many other types of dry cleaning machines that may be used instead. In this specification, any place the word clean appears, the words wash or dry clean may be substituted to obtain specific embodiments.

Service equipment 114 may be linked to computer system 112 and/or answering system 110. In an embodiment, after the user specifies how to service the user's articles via a website or answering service 110, answering service 110 and/or computer system 112 may send the user's service preferences to service equipment 114, which may automatically service the user's articles in the manner specified. For example, a human operator may add the batch of articles to a service machine, enter an identifier that identifies the batch, and then the service machine automatically handles the batch according the user service instructions that were sent from one of answering service 110 and/or a web page via computer system 112. For example, service equipment may wash and/or dry clean the clothing following service instructions that were downloaded from computer system 112 and/or answering service 110.

Camera 115 is optional. In an embodiment, upon picking up the articles from storage areas 102a-n or at a later time, camera 115 photographs articles that need to be cleaned. The photographs may serve as at least part of a record of which articles belong to which user. Items that are permanently tagged may only need to be photographed once when the permanent tag is attached. The photograph may be stored in association with an identifier associated the permanent tag. When the permanently tagged article is received a second time for servicing, the permanently tagged item does not need to be photographed a second time, because the prior photograph of the article may be used for identifying the article. In an embodiment, images of the articles within a batch of articles are stored in computer system 112, answering system 110, and/or another system capable of storing electronic images. In an embodiment, the images may be stored in a location such that they may be accessed by a user via the website. The user may then use the images of the articles to identify an article and specify the manner in which the article is to be cleaned.

Phone 116 may be an ordinary phone that may be used by a user to contact household services company 108 about articles. Phone 116 is communicatively linked via line 117 to network 106. Cell phone 118 may be a mobile phone that, via network 106, may be used by a user to contact household services company 108 about articles. Cell phone 118 is communicatively linked via line 119 to network 106. Network appliance 122 may be a personal computer, handheld computer, laptop, a terminal linked to a computer, or any other network appliance. In this specification, the term network appliance refers to any appliance capable of communicating via a network (e.g., a cell phone). Network appliance 122 may be used to communicate with household services company 108 via text and/or voice messages. Network appliance 122 is communicatively linked via line 124 to network 106. Phone 116, cell phone 118, and network appliance 122 are just some examples of the many different ways that a user may communicate with household services company 108.

Figure 2:
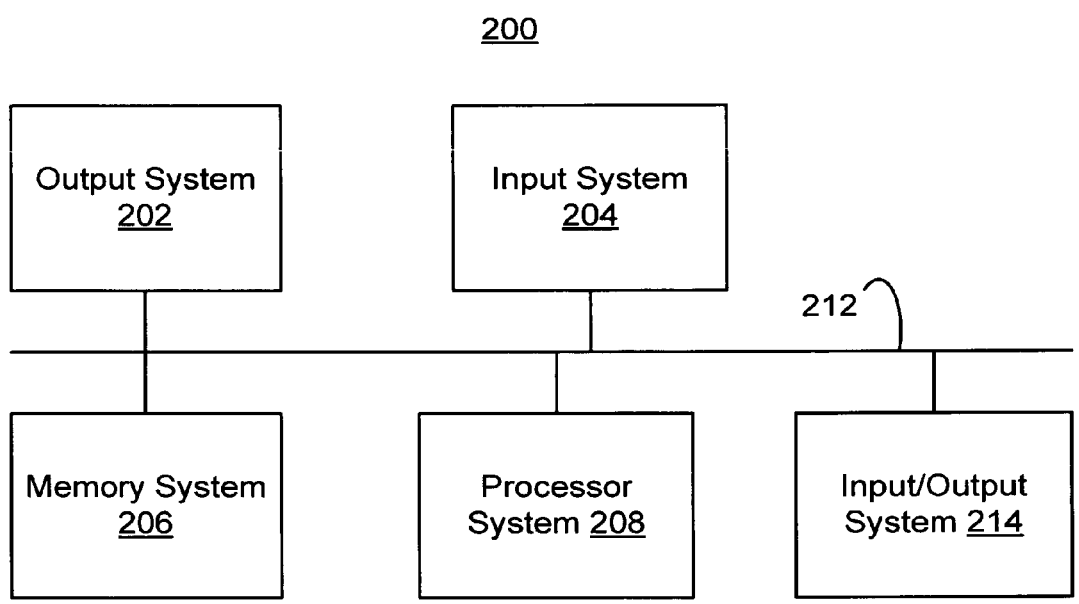
FIG. 2 shows a block diagram of an example of a computer system used in the system shown in FIG. 1.

FIG. 2 shows a block diagram of an embodiment of computer system 200 used in service system 100. The computer system 200 may include output system 202, input system 204, memory system 206, processor system 208, communications system 212, and input/output system 214. In other embodiments, computer system 200 may not include all of the components listed and/or may include other components in addition to or instead of those listed above.

Computer system 200 may be an embodiment of computer system 112 and/or network appliance 122. Output system 202 may include any one of, some of, any combination of, or all of a monitor system, a handheld display system, a printer system, a speaker system, a connection and/or interface system to one or more sound systems, a connection and/or interface system to one or more peripheral devices, a connection and/or interface system to one or more computer systems, a connection and/or interface system to one or more LANs, and/or a connection and/or interface system to one or more WANs, for example.

Input system 204 may include any one of, some of, any combination of, or all of a keyboard system, a mouse system, a track ball system, a track pad system, buttons on a handheld system, a scanner system, a microphone system, a connection and/or interface to a sound system, and/or a connection and/or interface system to a computer system, a connection and/or interface to an intranet, and/or a connection and/or interface to an internet (e.g., IrDA, USB), for example.

Memory system 206 may include, for example, any one of, some of, any combination of, or all of a long term storage system, such as a hard drive; a short term storage system, such as random access memory and/or flash memory; and/or a removable storage system, such as a floppy drive or a removable drive. Memory system 206 may include one or more machine-readable mediums that may store a variety of different types of information. The term machine-readable medium is used to refer to any medium capable of carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes mediums that carry information while the information is in transmit from one location to another, such as copper wire, optical fiber, air, and/or any other medium for carrying electrical energy, electromagnetic energy, and/or other forms of signals. Memory system 206 will be discussed further in connection with FIG. 4A.

Processor system 208 may include any one of, some of, any combination of, or all of multiple parallel processors, a single processor, a system of processors having one or more central processors and/or one or more specialized processors dedicated to specific tasks.

Communications system 212 communicatively links output system 202, input system 204, memory system 206, processor system 208, and/or input/output system 214 to each other. Communications system 212 may include any one of, some of, any combination of, or all of electrical cables, fiber optic cables, and/or means of sending signals through air or water (e.g., wireless communications), or the like. Some examples of means of sending signals through air and/or water include systems for transmitting electromagnetic waves such as infrared and/or radio waves and/or systems for sending sound waves.

Input/output system 214 may include devices that have a dual function as input and output devices. For example, input/output system 214 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 214 is optional, and may be used in addition to or in place of output system 202 and/or input device 204.

Figure 3:
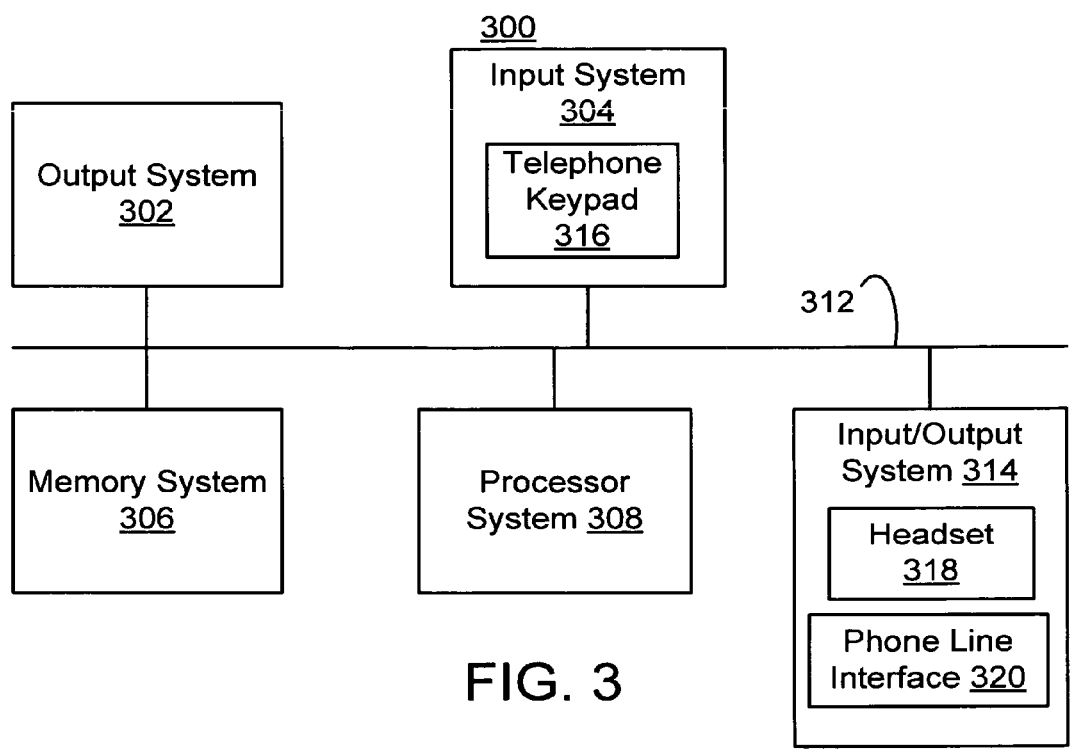
FIG. 3 shows a block diagram of an example of the answering system of FIG. 1.

FIG. 3 shows a block diagram of an embodiment of an answering system 300 that may be used by household services company 108. The answering system 300 may include output system 302, input system 304, memory system 306, processor system 308, communications system 312, and input/output system 314. In other embodiments, answering system 300 may not include all of the components listed and/or may include other components in addition to or instead of those listed above.

Answering system 300 is one example of answering system 110. In answering system 300, output system 302, memory system 306, processor system 308, communications system 312, and input/output system 314 may be the same as output system 202, input system 204, memory system 206, processor system 208, communication system 212, and input/output system 214, respectively, which were described in conjunction with FIG. 2, above. However, input system 304 may include a telephone keypad 316, while input/output system 314 may include a handset 318 and phone line interface 320. Telephone keypad 316 may facilitate dialing phone numbers so that a representative of household services company 106 may phone users and communicate about articles. Handset 318 may be used by a representative of household services company 106 (FIG. 1) to talk on the phone with a user. Phone line interface 320 may allow answering system 300 to connect to a telephone network for receiving and placing telephone calls.

Figure 4A:
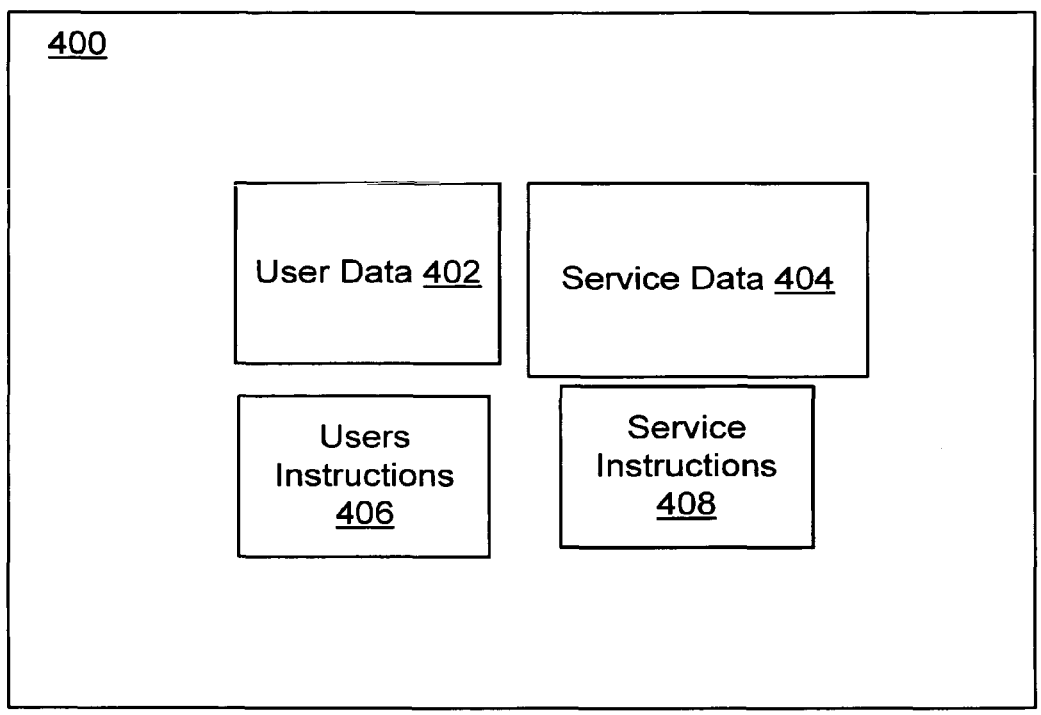
FIG. 4A shows a block diagram of an example of a memory system that may be used in the computer system of FIG. 2 and/or the answering service of FIG. 3.

FIG. 4A shows a block diagram of an embodiment of memory system 400. Memory system 400 may include user data 402, service data 404, user instructions 406, and service instructions 408. In other embodiments, memory system 400 may not include all of the components listed and/or may include other components in addition to or instead of those listed above.

Memory system 400 may be an embodiment of memory system 206 in which computer system 200 is an embodiment of computer system 112. Similarly, memory system 400 may be an embodiment of memory system 306. User data 402 is information that relates to users. User data 402 may include any of a variety of different types of information about users, such as names, mailing addresses, e-mail addresses, phone numbers, instant messaging addresses, billing information, other contact information, account information, and/or default service preferences.

Service data 404 may include information about current articles batches, such as pickup information for batches currently waiting to be picked up and storage area identifiers associated with various articles that were in batches of articles that were picked up. Service data 404 may include user service instructions (service instructions from the user, such as cleaning instructions) from the user associated with a particular article that needs to be cleaned. Service data 404 may include instructions for areas requiring special attention, such as tears that need to patched or sewn together, buttons that need to be replaced, hems that need to be taken in or let out, other alterations that need to be performed. In this specification, references to the user service instructions, whether referred to as user service instructions or by another term although also generic to many other types of user service instructions may include and may even only be stain indications and/or stain locations(even though in several places in this specification stain indications or stain locations are sometimes listed separately in the same sentence as the user service instructions).

Service data 404 may include a current status of the individual articles and/or the entire batch of articles, such as whether a particular article is currently being washed, was already washed but not dried or whether the article was already dried. Service data 404 may include an indication of percentage of the service for the entire batch of articles is complete. Service data 404 may include an expected date and/or time of when the batch of articles are expected to be ready for pickup and waiting in one or storage areas 102*a-n*. Optionally, service data 404 may include images of the articles associated with various batches of articles. Service data 404 may include stain information, such as which garment or other article contains the stain, where on the garment the stain is located, the cause of the stain (e.g., ketchup, wine, or motor oil) and the type of stain. In an alternative embodiment, service data may also include information about articles that are expected to be waiting to be picked up from one of storage areas 102*a-n* at a particular time. If there are multiple locations where storage areas 102*a-n* are located, service data 404 may include information about where to drop off each batch of articles once the batch is clean.

User instructions 406 may include instructions for receiving information from a user and/or providing information to a user. The transfer of information that user instructions 406 controls may include a direct interaction with a user or an interaction that occurs via a household services company representative. For example, a user may directly interact with user instructions 406 by logging on to a website associated with household services company 108, if memory 400 is memory 206. Alternatively a user may directly interact with user instructions 406 by phoning household services company 108 and talking into answering system 110, if memory 400 is memory 306. In this embodiment, user instructions may be an automated answering machine that includes a voice menu (and the voice responses of the user may be converted into machine instructions that are automatically sent to service equipment 112 or to part of user data 402). In yet another embodiment, a user may call household services company 108, and speak to a household services company representative. The household services company representative may then enter information into or retrieve information from computer system 112 by interacting with user instructions 406. User instructions 406 may set up new accounts for new users, place orders for servicing new batches of articles, make payments and/or return status information about current batches of articles. User instructions 406 may automatically send a text message and/or voice message to the user when the user's articles are ready.

Service instructions 408 may track batches of articles and/or may control automated service processes, if there are any. Service instructions 408 may include a user interface for a household services company representative to enter information about a batch of articles.

User data 402 and/or service data 404 may be created by user instructions 406 and/or service instructions 408. For example, when a user establishes an account user instructions 406 may as a result create user data 406 and/or add to user data 406. In an embodiment, service data 404 may be created by user instructions 406 and subsequently updated by service instructions 408 as the batch of articles proceeds through the cleaning process, as controlled by service instructions 408. Alternatively, all or part of user data 402 and/or service data 404 are created and/or updated by representatives of household services company 108.

Figure 4B:
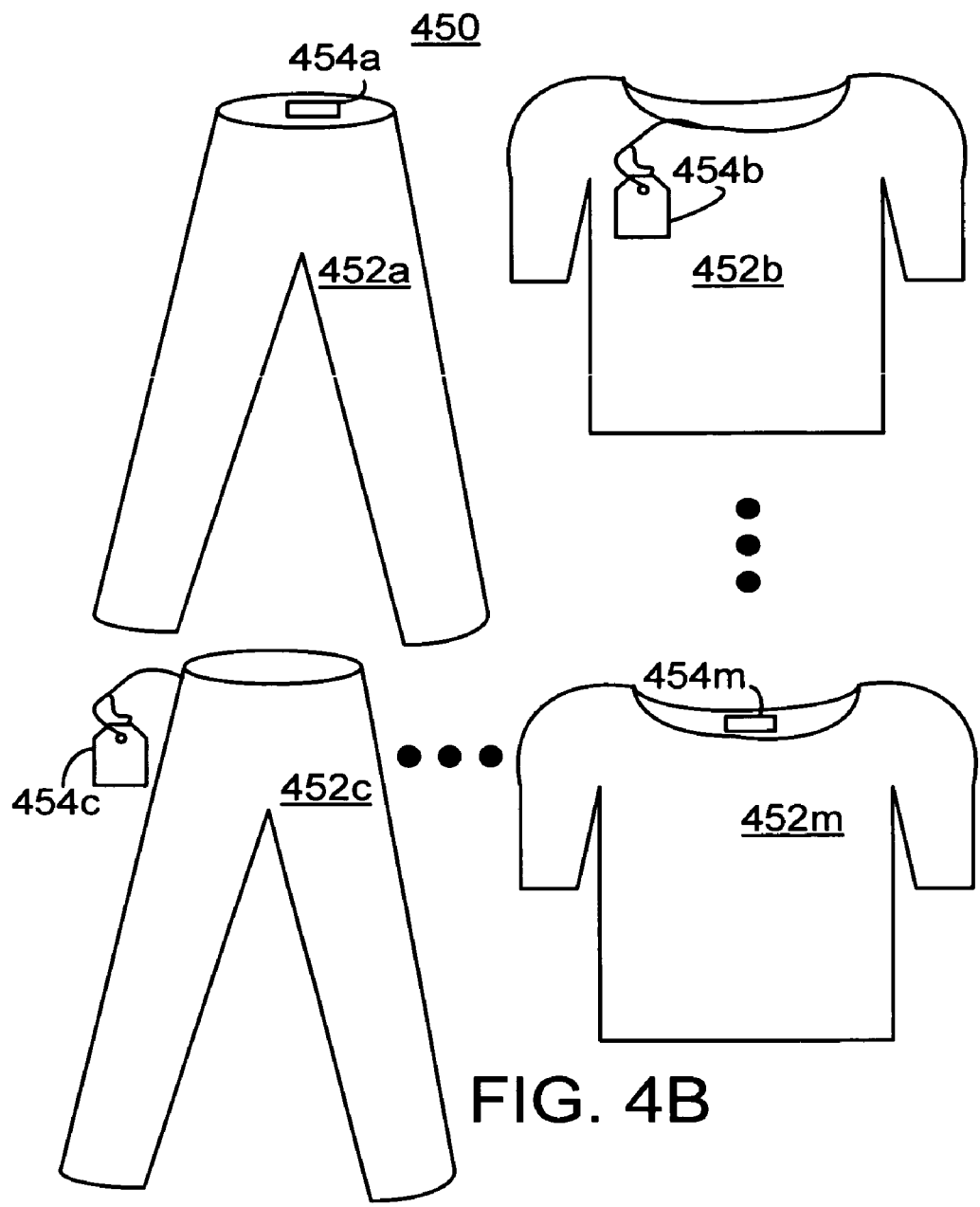
FIG. 4B shows a representation of an example of a tagged batch of articles that need service.

FIG. 4B shows a representation of an example of a service batch 450, which has been tagged. Service batch 450 includes articles 452*a-m* and tags 454*a-m*. In other embodiments, service batch 450 may not include all of the items listed and/or may include other items in addition to or instead of those listed above.

Service batch 450 is an example of a batch of articles that may be left in one of storage areas 102*a-n* (FIG. 1), and articles 452*a-m* are examples of some articles that may be included in service batch 450. Although the illustration of articles 452*a-m* in FIG. 4B only shows shirts and pants that need to be cleaned, any type of clothing or other types of articles that need to be serviced may be included in service batch 450.

Tags 454*a-m* are examples of tags that may be used for tagging articles, such as articles 452*a-m*. In an embodiment, only articles that are dry cleaned, that the user wants individually tagged, and/or require individual attention are individually tagged. In an embodiment, if the user gives household services company 108 permission, the tagged item may be permanently tagged. Tags 454*a* and 454*m* are examples of permanent tags, and tags 454*b* and 454*c* are examples of temporary tags. Tags 454*a-m* may include an identifier for identifying the article. A history of the item and handling preferences are stored (e.g., on a computer readable medium) in association with the identifier identifying of the tag. In an embodiment, one or more of tags 454*a-m* may include (e.g., stored on the tag) identifying information of the user (e.g., name, address, phone, number, and/or e-mail address) a history of the garment, and/or the user's cleaning preferences. For example, one or more of tags 454*a-m* may include a computer readable medium that stores the garment's history and/or the user's cleaning instructions. As another example, one or more of tags 454*a-m* may include barcodes and/or Radio Frequency Identifiers (RFIDs). If one or more of tags 454*a-m* are RFIDs, the RFIDs may store identifying information of the user (e.g., name, address, phone, number, and/or e-mail address) a history of the garment, and/or the user's cleaning preferences. In an alternative embodiment, all articles are tagged (with identifiers, which may also be referred to as identifications), so that each article may be identified. The identifiers may be used to identify the user of the articles. A different identifier may be placed on each of tags 454*a-m*, and the identifiers may be stored by computer system 112 in association with the user and/or a picture of the article, thereby allowing the user to refer to the article of by its unique identifier. The clothing that has been identified may be photographed by camera 115, so that the pictures of clothing 452*a-m* may be uploaded to a website associated with household services company 108 (FIG. 1).

In an embodiment, all of the articles in a batch are tagged, but not all of the articles are tagged with permanent tags. The tagging of each article and the identifying of each article of clothing with a different identifier is optional. In other embodiments, the articles of clothing are not tagged. In another embodiment, the articles may be tagged, but with tags that just identify the service batch to which the article belongs, but do not directly identify the user and/or the particular article (e.g., no photograph of the article is stored in answering system 110 or computer system 112).

Figure 5:
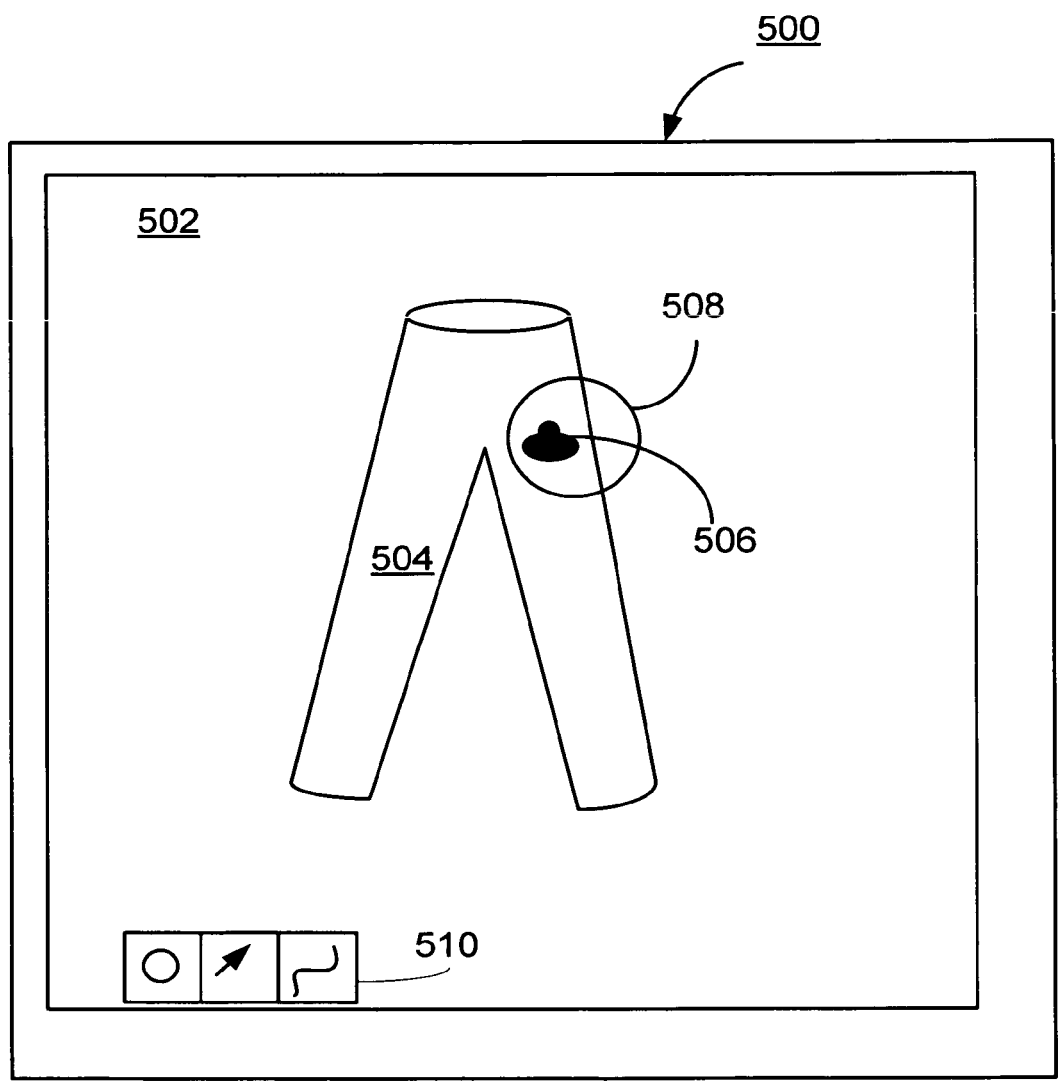
FIG. 5 shows a representation of an example of a webpage that may be presented by a website associated with the household services company of FIG. 1.

FIG. 5 shows a block diagram of an example of webpage 500. Webpage 500 may include article image 504, stain 506, region indicator 508, and optional tools 510. In other embodiments, webpage 500 may not include all of the components listed and/or may include other components in addition to or instead of those listed above.

Webpage 500 may be used for indicating the location of one or more regions on an article where a particular type of work needs to be performed, such as removing a stain, repairing a defect, or painting a scratch. Article image 504 may be a picture of the user's actual article, which may have been photographed with camera 115 (FIG. 1). Although in the example of FIG. 5, the article is clothing, webpage 500 may be used for identifying a location on any other article where special attention is needed. Stain 506 may be an image of a stain on a picture of the user's clothing or any other article. Stain 506 is just one example of region that needs special attention. As mentioned above, webpage 500 could also used for identifying location of a scratch, for example. In this embodiment, the user logs on to the website and selects the photograph of the article that has the region requiring special attention, and indicates the location of the region on the article. Region indicator 508 indicates the location of the region that needs special attention, such as a region having a stain, for household services company 108 to service. The user may add region indicator 508 to article image 504 to indicate where a region requiring special attention is located. Optionally, other information may be entered into a website associated with webpage 500, such as the cause of a defect and/or the nature of the defect. For example, if the region requiring special attention includes a stain on an article of clothing, the user may enter stain information and/or other information identifying an article of clothing with the stain. In an embodiment, a textual description of the region requiring special attention and the nature of a special service required and/or a description of other service instructions may be entered by the user in addition to or instead of region indicator 508. In other words, in an embodiment the user may only be able to enter text information and/or may only be able to identify the article using text information, while in another embodiment, the user may be able to identify the region and/or the article using a combination of text and image information. In the region containing a stain, the text information may include the cause of the stain, and other information about how to clean the article, such as whether to dry clean or wash the article, whether to press the article, how much starch to use, the type of detergent to use, and/or, if the garment is being washed, whether to wash the garment on a delicate, permanent press, or other special setting.

Tools 510 are optional, and are optionally provided to the user. In conjunction with webpage 500 or an associated website the user may be provided with one or more tools for graphically indicating the location of a region needing special attention. In the example of FIG. 5, three tools are provided. One tool is for creating circles for circling the region, one tool is for creating arrows for pointing to the region, and one tool is for creating squiggly lines in case a more general type of a shape or line is needed. In one embodiment, after one of tools 510 is clicked upon (e.g., with a mouse) when the user moves the cursor to a point on the screen, clicks, and then moves the cursor. As a result, after the second click, as the cursor moves a graphical indicator that resembles the icon depicted on the face of the tool clicked is created. Although as depicted in FIG. 5 tools 510 includes three tools, one tool, two tools, or any number of tools may be provided. Other tools may be provided instead of or in addition to those illustrated. For example, the tools may include buttons which when depressed allow the user to create another shapes or highlight a region in a particular color. Thus, although in FIG. 5 region indicator 508 is depicted as a circle encircling the place where the region is expected to be located, other graphical indicators may be used instead of or in addition to circles, such as squares, ellipses, triangles, or any other shape. In an embodiment, arrows and/or lines (and not circles) are used to point to locations of stains. In another embodiment, the regions having the stains are highlighted by coloring the region a particular color, such as yellow, orange, red, green, or blue.

In an alternative embodiment, article image 504 may be a generic image of type of article of clothing. A web server associated with webpage 500, may store a series of several different images of generic articles that are intended to represent different types of articles, such as generic pieces of clothing or that are intended to represent different types of clothing. The user may logon to a website, and select the one of these several different images that best represents the article having a region requiring special attention, and use the image to aid in identifying the article of clothing with the stain and/or to identify the location of the stain on the article of clothing.

Figure 6:
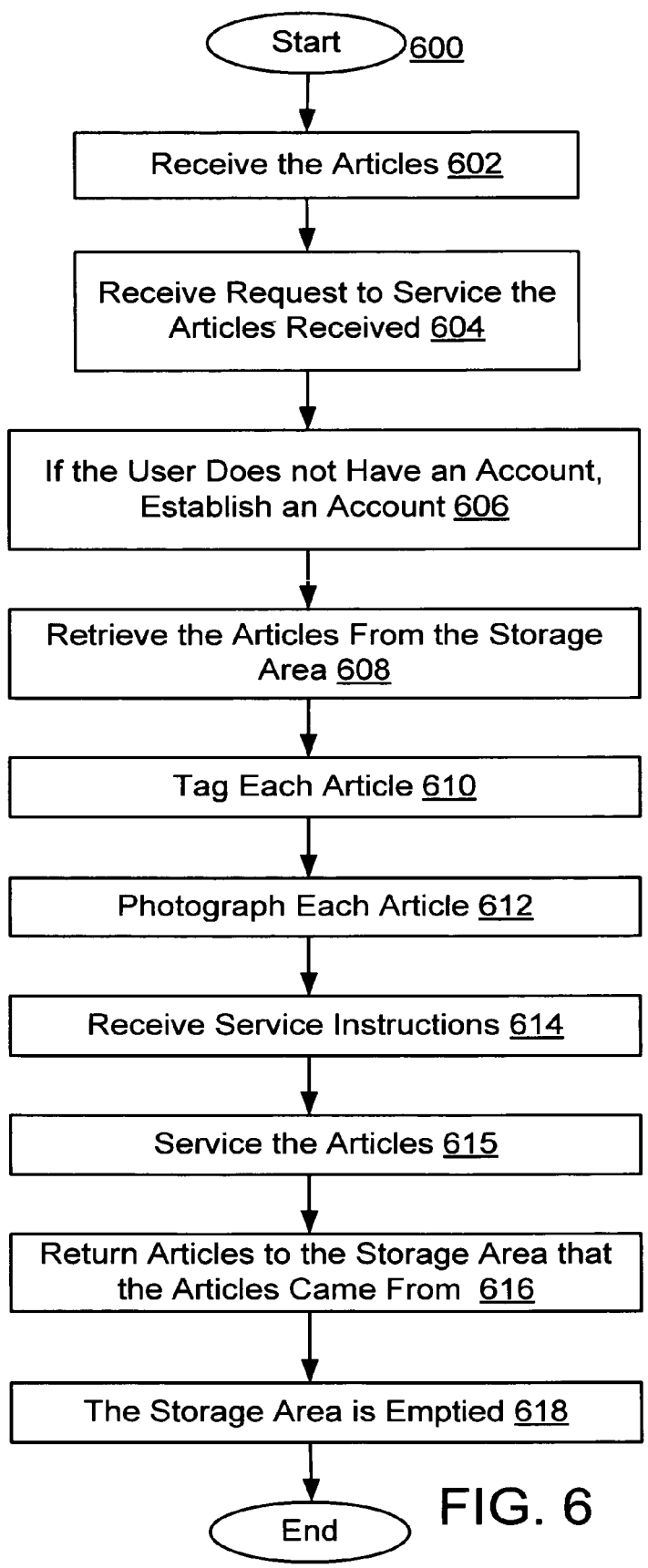
FIG. 6 shows a flowchart of an embodiment of a method for handling articles that need service, which is performed by the household services company of FIG. 1.

FIG. 6 shows a flowchart of an embodiment of method 600, which is performed by household services company 108. In step 602, articles are received in a storage area, such as a receptacle. In step 604, household services company 108 receives a request to service a batch of articles (e.g., clean a batch of clothing). Step 604 may include receiving a storage area identifier (e.g., a locker number) of a storage area containing the articles. In an alternative embodiment, the request to service the batch may be accompanied by instructions for how to service the articles, or user service instructions may be received at a later step. Step 604 may include receiving information about a feature requiring special attention, such as a stain, tear, or scratch. In an alternative embodiment, a combination or code may be received by the household services company for opening the storage area containing the articles. Step 604 may also include receiving a payment. In an embodiment, payment may be received at other times. In an embodiment, payment is received prior to the articles being returned. In step 606, if the user does not have an account, household services company 108 may also receive information for setting up an account. In step 608, household services company 108 (FIG. 1) retrieves the articles. In optional step 610, household services company 108 tags each article (e.g., articles of clothing) in the batch of articles. In optional step 612, household services company 108 photographs the articles associated with the batch and uploads the pictures to a web server. The pictures may then be stored in a location where the user may view the pictures for identifying regions needing special attention or identify the articles for other purposes.

In optional step 614, the indications of locations of the region requiring special attention, and/or instructions for servicing articles and/or the regions are received in addition to, or instead of, receiving user service instructions earlier. Optionally, the user service instructions are never received. In optional step 614, the request for the status of the articles are received from the user. Step 614 may be repeated and/or performed anytime.

In step 615, the articles are serviced, and if user service instructions are received the articles are serviced according to the user service instructions. In an embodiment, the service equipment downloads information related to the user service instructions (e.g., one or more machine executable service instructions derived from the user service instructions), and automatically carries out some or all of the user service instructions. for example a washing machine may download whether to wash a piece of clothing in hot, warm, or cold water.

In step 616, the articles may be placed in the one of storage areas 102*a-l* that the user reserved by taking the key, and the articles are ready for pickup (in an embodiment only the user's articles may be placed in the storage area and no other user is granted permission to access that storage area until the user picks up the articles). Optionally, household services company 110 may send an indication (e.g., an automated message such as a text message) to the user, or household services company 110 may otherwise inform the user that the articles are waiting for pick up. Alternatively, information provided to a user, during a status check may include the date and/or time at which the articles will be ready for pickup by the user. Step 616 may involve unlocking the storage area to return the articles to the storage area and locking the storage area after returning the articles. In step 618, the storage area is emptied by the user. If a physical key was used, the key may be received from the user at the storage area.

In an embodiment, each of the steps of method 600 is a distinct step. In another embodiment, although depicted as distinct steps in FIG. 6, steps 602-618 may not be distinct from one another. In other embodiments, method 600 may not have all of the above steps and/or may have other steps in addition to, or instead of, those listed above. Although in one embodiment the steps of method 600 are preformed in the order listed above in other embodiments, the steps of method 600 may be performed in another order and only some of possibly none of the steps of method 600 are preformed in the order listed above. For example, in other embodiments, steps 602-608 may be performed in any order with respect to one another. Also, step 606 may be performed at any time with respect to the other steps. However, after the articles have been returned to the user, if step 606 was not yet performed, the user may not have much of an incentive to establish an account and pay for the services provided. Steps 610 and 612 may be performed in any order with respect to one another. If step 614 does not rely on steps 610 or 612, or the parts of step 614 that do not rely on steps 610 or 612 may be performed at anytime prior to cleaning the articles to which the user service instructions pertain. Subsets of the steps listed above as part of method 600 may be used to form their own method.

Figure 7:
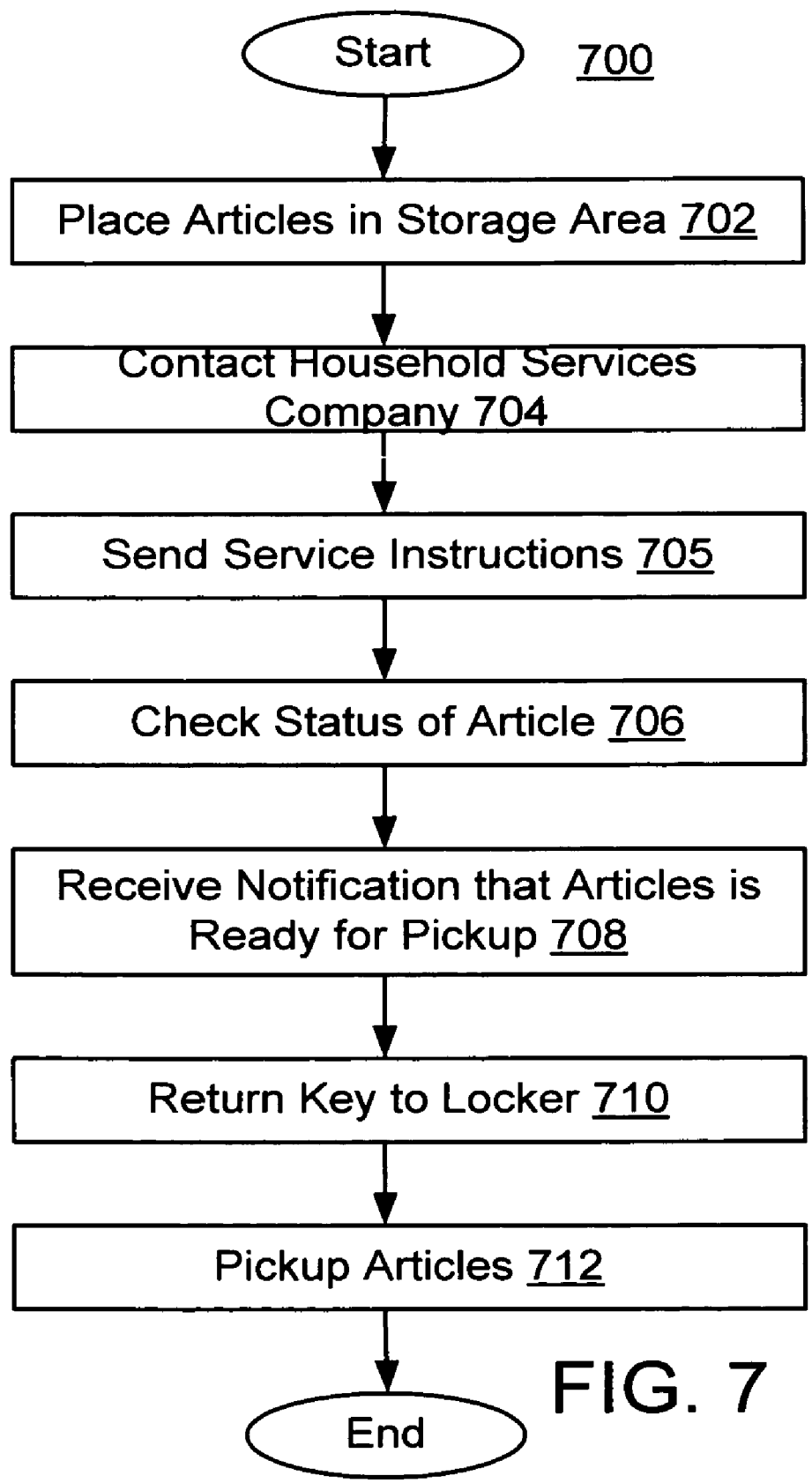
FIG. 7 shows a flowchart of an embodiment of a method for using the services provided by the household services company of FIG. 1, which may be performed by a user.

FIG. 7 shows a flowchart of an embodiment of a method 700, which may be performed by a user. In step 702, the user places the articles in the storage area. Step 702 may include the user locking the storage area and taking the key. In this embodiment, the user keeps the key until the articles are returned to the storage area, and the storage area is not used by other users prior to the articles of the current user being picked up from the storage area. In alternative embodiments, the lock requires a code or combination in order to be opened, which allows the household services company to change the code or combination for use by other users after the articles are picked up.

In step 704, the user contacts the household services company, and in an embodiment if the user does not have an account, the user sets up an account. In an embodiment, in step 704, the user may send a request to household services company 108 (FIG. 1) to pick up and clean a batch of articles. The request may include an identifier associated with the storage area where the articles are stored, and may include an identification of the user. Step 704 may also include making a payment (e.g., on line or via telephone). In an embodiment, the payment may be made at other times. In an embodiment, the payment is made prior picking up the articles at the storage area. For example, the credit card information may be taken at this point. In another embodiment, the user is not billed until after the articles are picked up and inventoried. In other words, instead of the user informing household services company 108 how many articles were in the batch and computing the amount of the bill, household services company 108 inventories the articles and then informs the user what the amount of the bill, and requests payment.

In optional step 705, the user may send stain information and/or user service instructions to household services company 108. Optional step 705 may be performed by the user calling and verbally transmitting information about a feature requiring special attention associated with a region requiring special attention, and/or user service instructions, by the user sending a text message, and/or by the user logging into a website associated with household services company 108 and entering the stain information and/or user service instructions. The website may include fields for entering text information and/or may include one more web pages for entering graphical indications as to the locations of stains. In optional step 706, the user checks the status of the articles. In step 708, the user receives (e.g., via retrieving and/or passively receiving) a notification that the articles are ready for pickup. If the code has been changed, the user may be supplied with a new code for opening the storage area (which may be expected to be accessible exclusively by that user). In step 710, the user returns the key to the storage area. In step 712, the user picks up the articles from the storage area.

In an embodiment, each of the steps of method 700 is a distinct step. In another embodiment, although depicted as distinct steps in FIG. 7, steps 702-712 may not be distinct from one another. In other embodiments, method 700 may not have all of the above steps and/or may have other steps in addition to or instead of those listed above. Although in one embodiment the steps of method 700 are preformed in the order listed above, in other embodiments the steps of method 700 may be performed in another order, and only some of, or possibly none of, the steps of method 700 are preformed in the order listed above. For example, steps 702-705 may be performed in any order with respect to one another, and step 706 may be performed any time after step 704. Also, in an alternative embodiment, step 710 may be performed any time after household services company 108 picks up the articles. However, if another user uses the same locker prior to the articles being returned, household services company 108 (FIG. 1) may need to return the articles to a different location. Subsets of the steps listed above as part of method 700 may be used to form their own method.

Figure 8:
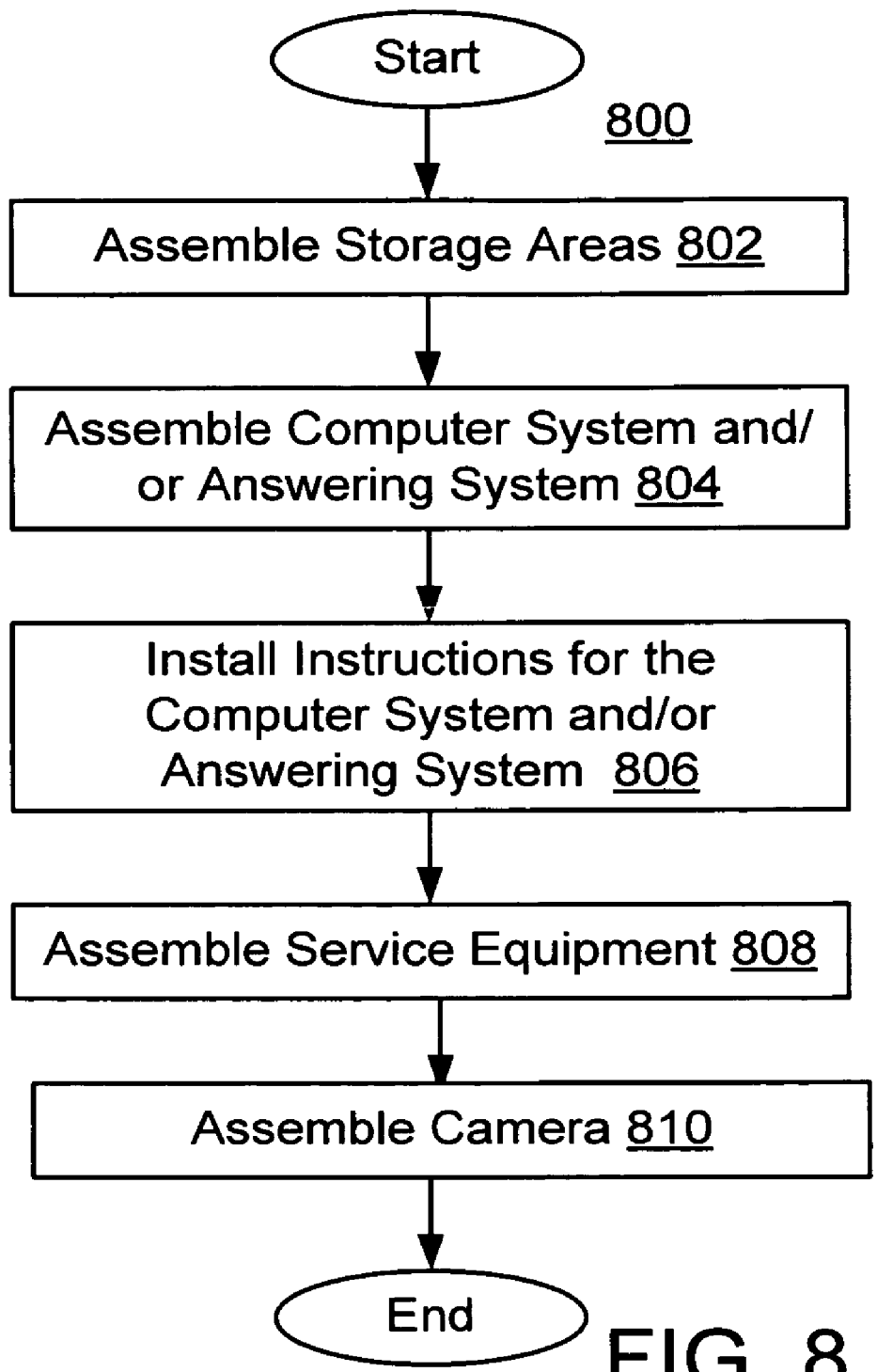
FIG. 8 shows a flowchart of an embodiment of a method for constructing and/or assembling the household services company of FIG. 1.

FIG. 8 is a flowchart of an embodiment of a method 800 of assembling, installing and/or configuring household services company 108 (FIG. 1). In step 802, storage areas 102*a-n* are procured, installed, and/or assembled, provided with locks 104*a-n*, and provided with keys 103*a-n* for locks 104*a-n*, respectively. Optionally, locks 104*a-n* allow keys 103*a-n* to be removed when locks 104*a-n* are locked. In step 804, computer system 112 and/or answering system 110 are assembled (FIG. 1). Step 804 may include communicatively coupling computer system 112 and/or answering system 110 to network 106 (FIG. 1) and/or to one another network. In step 806, the machine instructions (e.g., software) for answering system 110 and/or computer system 112 are installed. During step 806, user instructions 406 and service instructions 408 may be installed (FIG. 4). During step 806, a webpage and/or website may be installed and configured for receiving user service instructions, stain information, requests for articles pickup, and/or status requests from the user. In step 808, service equipment 114 (FIG. 1) is assembled, procured, and/or installed. Step 808 may optionally include communicatively coupling service equipment 114 to answering service 110 and/or computer system 112, so that machine instructions derived from user service instructions may be sent to service equipment 114. In optional step 810, camera 115 (FIG. 1) is assembled and may be communicatively coupled to answering system 110 and/or computer system 112, so that the pictures of clothing taken may be stored and/or placed on a web server for access by a user, via a web page.

In an embodiment, each of the steps of method 800 is a distinct step. In another embodiment, although depicted as distinct steps in FIG. 8, steps 802-810 may not be distinct from one another. In other embodiments, method 800 may not have all of the above steps and/or may have other steps in addition to or instead of those listed above. Although in one embodiment the steps of method 800 are preformed in the order listed above in other embodiments, the steps of method 800 may be performed in another order and only some, or of possibly none of, the steps of method 800 are preformed in the order listed above. For example, as long as enough of computer system 112 and/or answering service 110 have been assembled so that the software can be installed prior to performing step 806, and as long as prior to communicatively coupling two items, enough of both are assembled to perform the communicatively coupling, any of steps 802-810 may be performed in any order with respect to one another. Subsets of the steps listed above as part of method 800 may be used to form their own method.

Each embodiment disclosed herein may be used or otherwise combined with any of the other embodiments disclosed. Any element of any embodiment may be used in any embodiment. Although the invention has been described with reference to specific embodiments, it will be understood by those skilled in the art that various changes may be made and equivalents may be substituted for elements thereof without departing from the true spirit and scope of the invention. In addition; modifications may be made without departing from the essential teachings of the invention.

The invention claimed is:

1. A method comprising:
   receiving articles in a storage area associated with a laundry service, the storage area being associated with an identifier that was assigned to the storage area prior to a user visiting the storage area, the storage area having a purely mechanical lock and a purely mechanical key, the key mechanically locking and mechanically unlocking the lock;
   allowing a user to take the key with the user, without being required to be at a location associated with the laundry service;
   receiving a notification that the articles are associated with the storage area, the notification including the identifier associated with the storage area and an identifier associated with the user and the notification being generated by the user, the notification being received via the Internet at a computer system having a processor system with one or more processors;
   associating, by the processor system of the computer system, the user with the articles based on
      the identifier associated with the storage area, and
      the identifier associated with the user;
   providing, by the processor system, a pictorial representation of the article;
   receiving, at the computer system, a graphical indication on the pictorial representation, the graphical indication being of a portion of the pictorial representation at which special attention is requested;
   providing, via the processor system, a status of the article via one or more web pages; servicing the articles; and
   returning the articles to the storage area.

2. The method of claim 1, further comprising:
   maintaining a set of a plurality of storage areas, a set of the plurality of locks, and a set of a plurality of keys, when one of the plurality of storage areas is not in use, a corresponding one of the plurality of keys is stored inside a corresponding one of the plurality of locks, which corresponds to the one of the plurality of storage areas that is not being used.

3. The method of claim 1, further comprising:
   allowing a user to hold onto the key until a batch of articles associated with the user is returned to the storage area associated with the key.

4. A method comprising:
   receiving articles in a storage area associated with a laundry service, the storage area being associated with an identifier that was assigned to the storage area prior to a user visiting the storage area, the storage area having a mechanical lock and key, the key mechanically locking and mechanically unlocking the lock;
   receiving a notification that the articles are associated with the storage area, the notification including the identifier associated with the storage area and an identifier associated with the user and the notification being generated by the user, the notification being received via the Internet at a computer system having a processor system with one or more processors;
   associating, via the processor system of the computer system, the user with the articles based on
      the identifier associated with the storage area, and
      the identifier associated with the user;
   providing, via the processor system, a pictorial representation of the article;
   receiving a graphical indication on the pictorial representation, the graphical indication being of a portion of the pictorial representation at which special attention is requested;
   providing, via the processor system, a status of the article via one or more web pages;
   storing the key in the lock, while the storage area is not in use by a customer, the lock being configured such that removing the key locks the lock and such that in order for the lock to be unlocked the key must be in the lock.

5. The method of claim 4, wherein the storage area is a locker, the articles including at least clothing, and the method further comprises:
   inventorying the clothing after receiving the notification, and
   cleaning the clothing.

6. The method of claim 4, wherein
   the storage area is a locker, the articles including at least clothing, and:
   after receiving the articles removing the articles from the storage area, inventorying the clothing prior to receiving the notification.

7. The method of claim 4, further comprising photographing at least one of the articles received.

8. The method of claim 7, further comprising:
   uploading a photograph resulting from the photographing to a webpage that is viewable by a user.

9. A method comprising:
   receiving articles in a storage area associated with a laundry service;
   allowing a user to take the key, the user being one from which the articles were received in the storage area; and
   receiving a notification that the articles are associated with the storage area,
   wherein the storage area is associated with a purely mechanical lock and a purely mechanical key;
   associating, by a processor system of a computer system, a user with the articles after establishing an account for a user associated with the articles and receiving the notification;
   providing, by the processor system, a pictorial representation of the article;

receiving, at the computer system, a graphical indication on the pictorial representation, the graphical indication being of a portion of the pictorial representation at which special attention is requested;

cleaning the article;

providing, by the processor system, a status of the article via one or more web pages; and returning the article to the storage area.

10. A method comprising:

receiving articles in a storage area associated with a laundry service;

receiving a notification that the articles are associated with the storage area;

providing, via a processor system of a computer system, a pictorial representation of the article, the processor system including one or more processors;

receiving, at the computer system, a graphical indication on the pictorial representation, the graphical indication being of a portion of the pictorial representation at which special attention is requested, the portion of the pictorial indication the location being visible and not being obscured by the graphical indication;

cleaning the article;

providing, by the processor system, a status of the article via one or more web pages; and returning the article to the storage area.

11. The method of claim 10, the pictorial representation not being a photograph of an article of a customer to which the pictorial representation was provided, but a representation of a type of article; and receiving a selection of the pictorial representation and an association of the pictorial representation with an article belonging to the customer, the article belonging to the customer being of the type represented by the pictorial representation.

12. The method of claim 10, the providing of the pictorial representation including providing a plurality of pictorial representations, the plurality of pictorial representations not being photographs of articles of a customer to which the plurality of pictorial representations were provided, each of the plurality of representations being of a different type of article;

receiving a selection of one of the plurality of the pictorial representations and an association of the one of the plurality of pictorial representations with an article belonging to the customer, the article belonging to the customer being of the type represented by the pictorial representation.

13. The method of claim 10, the special attention including at least special cleaning procedures.

14. A method comprising:

receiving articles in a storage area associated with a laundry service; and receiving a notification that the articles are associated with the storage area; wherein the storage area is a receptacle associated with a lock and a key;

maintaining a set of one or more keys, which when not in use are each stored inside a lock of a corresponding receptacle that is not being used;

removing the articles from the receptacle;

establishing an account for a user associated with the articles after receiving the notification;

providing, by a processor system of a computer system, a pictorial representation of the article;

receiving, at the computer system, a graphical indication on the pictorial representation, the graphical indication being of a portion of the pictorial representation at which special attention is requested;

providing, by the processor system, a status of the article via one or more web pages;

receiving user service instructions after the articles have been removed from the receptacle;

allowing a user to hold on to the key until the articles associated with the user is returned to the receptacle associated with the key;

returning the articles to the receptacle from which the articles was picked up; and sending a notification to the user that that the articles are ready to be picked up.

15. The method of claim 14, further comprising:

tagging each article of a set of one or more articles selected from the articles received;

associating a different identifier with each article tagged;

photographing articles that were tagged;

uploading a photograph resulting from the photographing to one or more web pages, therein forming an uploaded photograph that is viewable by the user;

receiving a graphical indication on the pictorial representation of a location of a feature, for which special attention is desired, in association with the uploaded photograph; the feature being visible and not being obscured by the graphical indication;

locating and treating the feature based on the graphical indication; and at least partially automatically servicing the articles according to at least part of the user service instructions.

16. The method of claim 15, further comprising:

the user placing the articles in the receptacle therein causing a laundry service to perform the receiving of the articles in the receptacle;

the user retaining the key until the articles are returned to the receptacle;

the user accessing one or more web pages associated with the laundry service;

the user identifying the one or more images of articles associated with the articles;

the user graphically identifying the feature on the article;

the user providing the user service instructions via the one or more web pages;

as a result of the sending, the user receiving an automated message associated with the laundry service indicating that the articles are ready for pick up;

the user retrieving the articles from the receptacle after receiving the message; and the user returning the key to the receptacle for storage.

17. A method comprising:

placing articles in a storage area having a lock and a purely mechanical key, the storage area being stationary and associated with a laundry service; and the user retaining the key until the articles are serviced and returned to the storage area, without being required to be at the laundry service;

receiving, at a computer system, a pictorial representation of the article, via a network;

adding by a processor system of the computer system, a graphical indication on the pictorial representation, the graphical indication being of a portion of the pictorial representation at which special attention is requested and the processor system including one or more processors;

receiving, at the computer system, by the processor system, a status of the article, via the one or more web pages;

retrieving the articles by at least placing the key in the lock;

unlocking the lock with the key, the lock can be in the unlocked state only while the key is in the lock;

removing the articles from the storage area; and storing the key in the lock for the next user.

18. A method comprising:
placing articles in a storage area having a lock and a key; and
retaining the key until the articles are serviced and returned to the storage area, wherein the storage area is a receptacle that is associated with a laundry service that is expected to service the articles, and:
accessing, by a processor system of a client's computer system having one or more processors, one or more web pages associated with the laundry service;
identifying, by the processor system, one or more images of articles associated with the articles;
graphically identifying a feature, by the processor system, for which special attention is requested, on the one or more images of the articles;
receiving at the user's computer system, user service instructions via the one or more web pages;
accessing, by the processor system, via the one or more web pages, status information about of the article;
receiving, by a processor system of a computer system of the laundry service, an automated message associated with the laundry service indicating that the articles are ready for pick up;
returning the key to the receptacle; and
retrieving the articles from the receptacle after receiving the message.

19. The method of claim 18, wherein the articles are clothing, the service includes cleaning, and the receptacles are lockers.

20. The method of claim 18, the status being a status of the article within a cleaning process.

21. A system comprising:
a storage area for receiving articles, the storage area being associated with a laundry service, the storage area having a purely mechanical lock and a purely mechanical key for locking the storage area, the storage area being stationary;
the lock being configured such that removing the key locks the lock and such that in order for the lock to be in an unlocked state the key must be in the lock, therein encouraging a user to leave the key the in the lock when finished using the storage area; and
one or more computer readable media storing thereon at least a method including at least
providing, by a processor system of a computer system, a pictorial representation of the article, the processor system including one or more processors;
receiving, at the computer system, a request to service articles from the customer, the request including at least
an identification of a location associated with a laundry service where the articles were placed by the user in the storage area,
a graphical indication on the pictorial representation, the graphical indication being of a portion of the pictorial representation at which special attention is requested, and
information identifying the user; and
providing, by the processor system, a status of the article via one or more web pages.

22. The system of claim 21, wherein the method further comprises:
establishing an account for the user based on the request.

23. The system of claim 21 further comprising:
a set of one or more receptacles, which include the storage area, each receptacle having a lock and being associated with a key for locking the lock.

24. The system of claim 21, wherein the method further comprises:
receiving user service instructions from the user.

25. A system comprising:
one or more computer readable media storing thereon at least a method including at least
receiving, at a computer system, a request to service articles, the request including at least
an identification of a location associated with a laundry service where the articles were placed by a user, and
information identifying the user;
providing, by a processor system of the computer system, a pictorial representation of the article, the processor system including one or more processors;
receiving, at the computer, user service instructions from the user; the instructions including a graphical indication on the pictorial representation, the graphical indication being of a portion of the pictorial representation at which special attention is requested;
providing, by the processor, a status of the article via the one or more web pages;
and
service equipment configured for automatically servicing the articles according to the user service instructions after the articles are placed into the service equipment.

26. A system comprising:
one or more computer readable media storing thereon at least a method including at least at a computer system, receiving a request to service articles, the request including at least
an identification of a location associated with a laundry service where the articles were placed by a user, and
information identifying the user
the one or more computer readable media storing thereon instructions for generating, by a processor system of the computer system, a webpage, the webpage including a pictorial representation of the articles, processor system including one or more processors;
instructions, by the processor system, for providing a status of the article via one or more web pages;
and
tools, generated by the processor system, that are available to a user for graphically identifying locations of features on the pictorial representation of the articles, for which special attention is requested, on the articles, wherein the tools are associated with the web page.

27. The system of claim 26, the tools including a tool for drawing an arrow pointing to the location where special attention is requested.

28. The system of claim 26, the tools including a tool for drawing a closed shape surrounding the location where special attention is requested.

29. The system claim 28, the location within the closed shape being visible to the user.

30. The system of claim 26, the feature that needs special attention being visible on the image.

31. The system of claim 26, the portion of the pictorial representation having the feature that needs special attention being visible on the image.

* * * * *